Patented July 10, 1951

2,559,848

UNITED STATES PATENT OFFICE 2,559,848

PREPARATION OF PROTEIN SOLUTIONS

John R. Caldwell, Kingsport, Tenn., assignor to Eastman Kodak Company, Rochester, N. Y., a corporation of New Jersey No Drawing. Application May 23, 1947, Serial No. 750,161

4 Claims. (Cl. 106—135)

This invention relates to the preparation from animal and vegetable proteins of solutions of high clarity and unusual stability and suitable for use in the spinning of protein filaments and the manufacture of sheet material and related products. More particularly the invention relates to the preparation of formic and acetic acid solutions of the globular proteins such as those derived from cotton seed, peanuts, soybeans, alfalfa, gelatin, casein, hempseed and egg albumin.

It has long been known that various proteins derived from both vegetable and animal sources may be used in the preparation of filaments, fibers, films, ribbons, sheets and various other products. In fact, in recent years a considerable industry has grown up, particularly in Italy and other foreign countries, based upon the use of casein, the protein derived from skimmed milk. Various other proteins derived from vegetable sources, particularly those derived from soybeans, have come into prominence in the manufacture of artificial silk and related products. Both the technical and patent literature is replete with references to the manufacture from these materials of synthetic filaments and a wide variety of other products. However, the use of proteins has presented many serious obstacles, one of which is the preparation of solutions which would be sufficiently stable for use in practical spinning or sheet-forming operations.

The above mentioned prior art contains many references to the preparation of protein dispersions and solutions, but all of these are limited to solution or dispersion of the protein material in aqueous solutions of strongly alkaline agents such as aqueous sodium and potassium hydroxides, solutions of amines, urea or in strong inorganic acids such as sulfuric, hydrochloric and phosphoric acids. In fact, textbooks and reference books on proteins generally describe only the use of aqueous alkali or salt solutions as protein solvents. For example, the textbook, "Outlines of Biochemistry" by Gortner, published by John Wiley & Sons (1938 edition), page 14 states "The globulins are simple proteins, insoluble in pure water but soluble in dilute neutral solutions of the salts of strong acids or bases." In the recent book "Proteins, Amino Acids and Peptides" by Cohn & Edsal, published by Reinhold (1943 edition) the solubility characteristics of practically all known proteins are given. Notwithstanding that the use of various aqueous solutions of salts and alkalies are described in great detail, no mention is made of dissolving proteins in organic acid solvents such as formic or acetic acids or their aqueous solutions.

The use of aqueous solutions of an alkaline nature or of aqueous salt solutions, particularly solutions of strong alkalies such as sodium and potassium hydroxides, as a dissolving medium for the proteins have serious drawbacks. For example, the solutions of proteins resulting from the use of such alkaline solvents are unstable, undergo rapid changes in viscosity and clarity and must be used within five to ten days of preparation. Apparently the effect of such strong reagents is to cause hydrolysis and degradation of the protein molecule. Although numerous attempts have been made to overcome this difficulty, to the best of my knowledge and belief, prior to the advent of the present invention no successful solution of the problem has ever been suggested.

This invention has as an object to provide a method of forming highly stable protein solutions suitable for use in the manufacture of filaments, fibers, sheets and like materials. A further object is to provide a method of forming stable protein solutions from solvents which avoid the use of alkaline materials having a tendency excessively to degrade the protein molecule. A still further object is to provide clear viscous, highly stable solutions of the globular proteins, particularly those derived from cotton seed, peanuts, soybeans, alfalfa, gelatin, casein, hempseed, egg albumin and the like, which solutions are suitable for the manufacture of artificial silk and a wide variety of other products. Another object is to provide clear viscous solutions of proteins suitable for use as spinning and film-forming solutions which can be stored for long periods of time without developing haze or otherwise losing their clarity or undergoing any substantial change in viscosity. Other objects will appear hereinafter.

These objects are accomplished by the following invention which is based upon the discovery that the lower aliphatic acids such as formic and acetic acids will dissolve the globular proteins and form solutions of high stability and clarity. Specifically, I have found that formic and acetic acids containing up to 25% water, and preferably 5% to 25% water, exert a powerful swelling and/or peptizing action on many proteins and that these acids may be employed to dissolve proteins typified by those derived from peanuts, soybeans, alfalfa, gelatin, casein, hempseed, and egg albumin to produce clear viscous dopes which can be successfully employed as spinning solutions in the manufacture of artificial silk and in the formation of sheets, films and related products. Not only can proteins exemplified by those just mentioned be successfully dissolved, but the resulting solutions will remain clear for exceptionally long periods of time.

The unusual and unexpected nature of my invention will be apparent from a consideration of the fact that all of the solvents heretofore suggested for the formation of spinning and film-forming solutions from proteins have either been of a strongly alkaline nature or have been strong inorganic acids such as sulfuric, hydrochloric, phosphoric or salts thereof. In fact, as previously indicated, a survey of the most pertinent prior art would lead one to believe that proteins, not only are soluble only in aqueous solutions of such reagents, but also are actually insoluble in organic solvents. As further illustrating the unusual nature of my invention, solutions prepared from formic and acetic acids in accordance with the procedure herein described have been found to keep as much as thirty or forty times as long as the alkali or other protein solutions of the prior art without developing haze or undergoing an appreciable change in viscosity. For example, the formic and acetic acid solutions of protein of my invention will keep satisfactorily without degradation or denaturation for periods ranging upwards of 15 to 20 days and under such circumstances will remain clear, transparent and entirely satisfactory for use in spinning, coating and other operations. The alkali or other solutions of the prior art, on the other hand, cannot be kept for periods longer than a maximum of 12 to 15 hours without becoming unusable.

In the following examples and descriptions I have set forth several of the preferred embodiments of my invention, but they are included merely for purpose of illustration and not as a limitation thereof.

As indicated above, my invention is applicable to the formation of solutions from a rather wide variety of proteins. Typical of such proteins are soybeans, peanuts, cotton seed, hempseed, gelatin, casein and alfalfa stem proteins and egg albumin.

The proteins employed can be extracted and purified by the usual procedures. For example, a soybean protein prepared according to the procedure described in Ind. Eng. Chem. 36, 799 (1944) or a peanut protein extracted by the method described in Ind. Eng. Chem. 36, 164 (1944) are suitable for use in the process of my invention. Cotton seed protein extracted by the dilute alkali process can also be used, as can other proteins prepared by any of the known methods that minimize degradation and denaturation. The material may be employed either as the dried protein or in the form of wet press cake.

The solutions of my invention may be prepared by simply adding the protein to the acid in an open vessel and stirring until a clear, viscous dope is formed.

Although the protein can be dissolved in formic and acetic acid at fairly low temperatures approaching room temperature, I have found that solution is facilitated by heating the acid to moderately elevated temperatures, as, for example, a temperature within the range of 70 to 80° C. and slowly adding the protein material. In some cases, in order to further facilitate solution, the mixture may be placed in an autoclave and heated to temperatures above the boiling point of the acid or acids in question.

The concentration of the protein in the acid will depend upon the viscosity which is desired in the finished dope. For most purposes, such as the spinning of filaments and the formation of sheet material, the dope may contain 15 to 40% protein, the balance being solvent. However, the concentration will also vary with the particular protein selected. With some proteins it will be possible to employ as high as 50 to 60% solids content.

While I prefer to use a formic or acetic acid containing from 5 to 15% water, in some cases the anhydrous acid may be employed. If a mixture of formic and acetic acids is employed, the mixture may likewise contain up to 25% water. In addition, various modifying agents such as alcohols, glycols, amides and other carboxylic acids may be added in making up the solution, if desired.

As indicated above, the dopes prepared as just described are clear, viscous, highly stable solutions at temperatures of the order of 70 to 80° C. and set to clear, transparent gels at 30 to 40° C. In addition to the unusual properties of these solutions outlined above, they possess the remarkable property of forming reversible gels. For example, when a bottle of the dope in a fluid condition at 70 to 80° C. is cooled down to the 30 or 40° range the resulting gel may be again converted to its fluid condition simply by raising the temperature. This is a most unusual property when one takes into consideration that the protein gels obtained from aqueous alkaline protein solutions are not reversible and when once brought into the set or gelled condition must be discarded.

The nature of my invention will be further illustrated by the following examples.

*Example 1.*—One hundred grams soybean protein prepared by alkaline extraction of soybean meal, is stirred with 300 cc. of 90% formic acid at 70 to 80° C. until a clear, viscous dope is formed. The dope shows substantially no change in viscosity or clarity after standing for eight days or more at room temperature. The solution can then be used for extruding shaped articles such as filaments, sheets and the like by the procedure customarily employed for the production of such articles.

*Example 2.*—One hundred grams egg albumin, air dried, is slowly added with stirring to 350 cc. 80% formic acid at 60 to 70° C. until a clear, viscous dope is formed. The dope shows no change in viscosity or appearance after 10 days' storage. Clear, hard films are produced when the dope is coated on glass plates and the solvent evaporated at 60° C.

*Example 3.*—Casein is dissolved in 90% formic acid at 70° C. to give a clear, viscous dope at a concentration of 40% casein. This dope sets to a clear gel when cooled to 20° C. When warmed to 70 to 80° C. the gel breaks down and a clear, viscous dope is reformed. This reversible change can be repeated several times without appreciably degrading the protein.

*Example 4.*—Fifty grams soybean protein are stirred with 100 cc. 90% formic acid and 100 cc. acetic acid. The mixture is heated to 60 to 70° C. and then cooled to room temperature. A clear, viscous dope is formed that shows no tendency to gel or change in viscosity after 10 days' storage.

*Example 5.*—One hundred grams gelatin and 100 cc. water are warmed together until the gelatin has imbibed substantially all of the water. Six hundred cc. of acetic acid are added and the mixture is stirred at 70 to 80° C. until a clear, viscous dope is formed. The dope remains clear and viscous after standing 7 to 8 days at room temperature.

*Example 6.*—Fifty grams of soybean protein, prepared by alkaline extraction of soybeans, is soaked in 100 cc. acetic acid at room temperature for one hour. One hundred cc. of water are then added and the mixture is heated at 75 to 80° C. for two hours. Four hundred cc. of acetic acid are added and the mixture is stirred at 60 to 70° C. A clear, viscous dope is formed after stirring 2 to 3 hours.

*Example 7.*—One hundred grams soybean protein is stirred for two hours at 70 to 80° C. with 100 cc. water and 470 cc. acetic acid. The dope is then heated at 130° C. for 30 minutes in a stirring autoclave. The resulting dope is clear, smooth, and viscous. The viscosity remains substantially unchanged after 8 to 10 days' storage.

Although I have found it convenient to illustrate my invention by reference to certain specific examples of procedures, range of temperature and pressure, concentrations and materials employed, it will, of course, be understood that many changes may be made in these particulars within the scope of my invention. For example, although I prefer to dissolve the protein material in the acid or acids at moderately elevated temperatures of the order of 70 to 80° C., considerably lower temperatures approaching room temperature may be employed. Likewise, temperatures much in excess of 70 to 80° C. as, for example, temperatures above the boiling point of the acids may be employed, if provision is made for avoiding boiling away of the acids. As indicated, the concentration of the protein in the solution may vary over a wide range depending upon the type of protein employed, the viscosity desired in the finished solution and various other conditions of use or operation.

It will thus be seen that I have solved a problem of long standing in the art of dealing with the proteins, particularly as applied to their use in the manufacture of artificial silk, sheets, films and related products, in that I have provided a simple, effective and economical means of producing protein solutions of extremely high clarity and unusual stability. Such solutions are particularly to be distinguished from the previously known aqueous alkali and other types of protein solutions in that they are capable of producing reversible gels, a highly valuable property not possessed by known compositions.

What I claim is:

1. The process of preparing protein solutions of high clarity and stability and adapted for use in the manufacture of filaments which comprises dissolving a globular protein in an acid-solvent consisting essentially of aqueous acetic acid, the process being characterized in that the acid-solvent is heated to between 60° C. and 80° C. while slowly adding the globular protein thereto.

2. The process of preparing protein solutions of high clarity and stability and adapted for use in the manufacture of filaments which comprises dissolving a globular protein in an acid-solvent consisting essentially of a heated mixture of formic and acetic acids containing up to 25% water, the heating being within the range of 60° C. to 80° C.

3. The process of preparing protein solutions adapted for use in the manufacture of filaments which comprises incorporating a protein into an acid-solvent consisting essentially of aqueous acetic acid, the process being characterized in that the acid-solvent is heated to between 70 and 80° C. while stirring the protein with the solvent and thereafter subjecting the protein-containing liquid prepared as aforesaid to further heating at a higher temperature in an autoclave whereby a clear, smooth dope is obtained.

4. The process of preparing protein solutions of high clarity and stability and adapted for use in the manufacture of filaments which comprises incorporating a protein into a liquid consisting essentially of an aqueous acid-solvent essentially comprised of at least one aliphatic monocarboxylic acid of 1–2 carbon atoms contained in 5–25% water, the process being characterized in that the aqueous acid-solvent aforesaid is heated to between 60–80° C. while slowly adding the protein thereto.

JOHN R. CALDWELL.

REFERENCES CITED

The following references are of record in the file of this patent:

UNITED STATES PATENTS

| Number | Name | Date |
| --- | --- | --- |
| 883,995 | Weichmann | Apr. 7, 1908 |
| 1,023,022 | Lebreil | Apr. 9, 1912 |
| 1,245,984 | Satow | Nov. 6, 1917 |

FOREIGN PATENTS

| Number | Country | Date |
| --- | --- | --- |
| 20,548 | Great Britain | of 1906 |
| 16,616 | Great Britain | of 1912 |
| 111,171 | Great Britain | Nov. 22, 1917 |
| 419,675 | Great Britain | Nov. 16, 1934 |